Feb. 20, 1940. G. POTAPENKO 2,190,950
APPARATUS FOR DETERMINING THE INCLINATION AND DIRECTION OF A HOLE
Filed Nov. 3, 1937 3 Sheets-Sheet 1

INVENTOR.
Gennady Potapenko,
BY Russell M. Otis
ATTORNEY.

Feb. 20, 1940.  G. POTAPENKO  2,190,950
APPARATUS FOR DETERMINING THE INCLINATION AND DIRECTION OF A HOLE
Filed Nov. 3, 1937   3 Sheets-Sheet 2
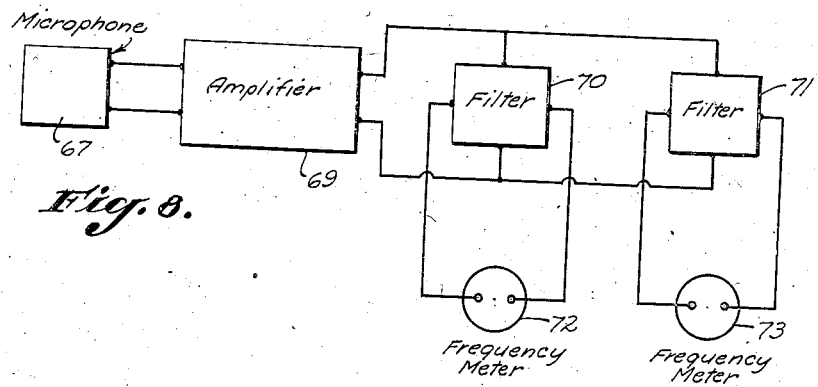
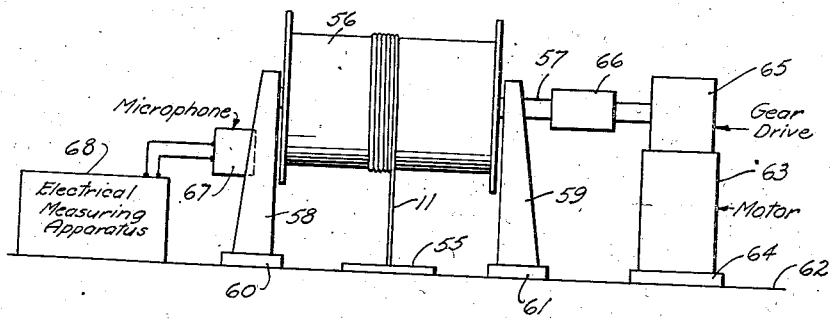
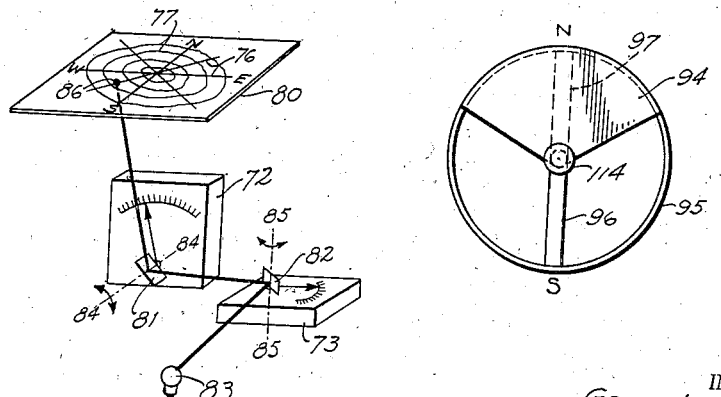
INVENTOR.
Gennady Potapenko,
BY Russell M. Otis
ATTORNEY.

Feb. 20, 1940.  G. POTAPENKO  2,190,950
APPARATUS FOR DETERMINING THE INCLINATION AND DIRECTION OF A HOLE
Filed Nov. 3, 1937  3 Sheets-Sheet 3

INVENTOR.
Gennady Potapenko,
BY Russell M. Otis
ATTORNEY.

Patented Feb. 20, 1940

2,190,950

UNITED STATES PATENT OFFICE 2,190,950

APPARATUS FOR DETERMINING THE INCLINATION AND DIRECTON OF A HOLE

Gennady Potapenko, Pasadena, Calif.

Application November 3, 1937, Serial No. 175,856

9 Claims. (Cl. 177—351)

This invention relates to an apparatus for determining the inclination and direction of a hole, and particularly to an apparatus suitable for use in connection with a deep hole such as the drill hole of an oil well.

While my invention is not limited in its application to any particular kind of a hole, it finds an especially important application in oil well drilling. It is very desirable to know the inclination from vertical and the direction of the drill hole of an oil well for the following reasons. Occasionally in faulty or irregular geologic structures a hole will fail to strike the oil sand which is known to lie in a certain location. By surveying the well for inclination and direction at various depths it is possible to find why the well missed the oil sand, and where, if possible, remedial directional drilling should be begun. A knowledge of well inclination and direction is, moreover, of great value to the geologist in determining exactly the position of underlying structures, which information, in turn, is of assistance in locating future wells. Furthermore, due to recent improvements in the technique of directional drilling it is possible to drill a hole in almost any predetermined direction, and this development makes it desirable to have adequate means for checking the progress of such directional drilling by frequent measurement of the inclination and direction of the drill hole.

It is an object of my invention to provide an apparatus and method for continuously measuring the inclination and direction of a hole at all points along it.

Another object of my invention is to provide apparatus whereby the inclination and direction of a hole are measured and visually indicated at the earth's surface instantly upon arrival of a part of the apparatus at any location in the hole selected for measurement.

In my co-pending patent application, Serial No. 134,925, I disclose apparatus also having the above-mentioned objects. The apparatus disclosed in my co-pending application includes two parts, one of which is located at the earth's surface and the other of which traverses the hole to be surveyed, the two being connected by a cable containing a plurality of insulated electrical conductors. In the case of very deep wells which may approach as much as 10,000 feet in depth, the cost of this electrically conducting cable is a very considerable item; and while this cost is amply justified by the excellent results attained, it is sufficiently great to stimulate effort to avoid the necessity of a cable containing a plurality of electrical conductors.

Accordingly, an object of this invention is to provide an apparatus for determining the inclination and direction of a hole which does not require, in the hole, a cable containing insulated electrical conductors and which does not depend upon the transmission of electricity from any point within the hole.

Still another object of my invention is to provide apparatus for determining the inclination and direction of a hole in which the measurements at the surface of the earth depend only upon the frequencies of elastic vibrations transmitted from that part of the apparatus which is located in the hole at the point where inclination and direction are being measured, in such manner that no error results due to any variation in amplitude or intensity.

These and other apparent objects I attain in a manner which will be clear from consideration of the following description taken in connection with the accompanying drawings, of which:

Fig. 3 is a view of a filter screen forming part of the automatic orienting mechanism, taken from the plane 3—3 of Fig. 1.

Fig. 7 is a view illustrating the arrangement of apparatus employed at the earth's surface.

Fig. 8 is a diagrammatic illustration of the electrical circuit connecting the electrical measuring apparatus employed.

Fig. 10 is a view of an alternative form of indicating instrument.

Figure 1:
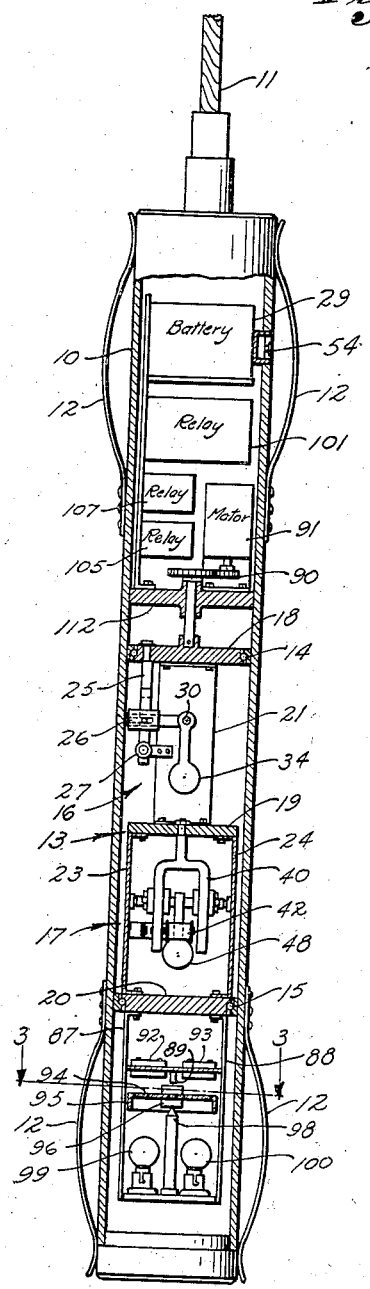
Fig. 1 is a partial sectional view of that part of the apparatus which is lowered into the hole being surveyed.

In its preferred form, my apparatus comprises two main parts, one of which, shown in Fig. 1, is lowered into the hole to be surveyed and the other of which remains on the earth's surface. The part lowered into the hole includes a casing 10 to which is attached a cable 11, preferably of steel, which serves as a support for the instrument and also as a means for transmitting to the apparatus on the earth's surface the elastic vibrations arising within the casing 10. The cable 11 need contain no insulated electrical conductors, for in the apparatus herein disclosed it is not necessary to maintain electrical connection with the apparatus in the hole. At each end of the casing are the longitudinally-extending springs 12 which are attached to the casing at one end, are bowed outwardly from the casing, and are left free at their other ends so that they may freely flex. When the casing is lowered into a hole, the springs 12, by contact with the wall of the hole, retain the casing 10 in alignment with the axis of the hole, while the springs 12 may flex when any small obstacle or irregularity is met and thereby permit passage of the instrument.

Within the casing 10 the structure 13 is mounted for rotation relative to casing 10 on bearings 14 and 15, and carries two similar devices 16 and 17 oriented perpendicularly to one another, one being sensitive to the component of hole inclination in the north-south direction, and the other being sensitive to the component of hole inclination in the east-west direction. The devices 16 and 17 are shown in detail in Figs. 4, 5, and 6. The structure 13 may have any suitable construction, but is shown here as including three members 18, 19, and 20, disposed perpendicular to the axis of casing 10 and consisting of discs with large holes through their centers, the members 18 and 19 being joined by longitudinally-extending connecting members 21 and 22, and members 19 and 20 being joined by longitudinally-extending members 23 and 24. The members 18 and 20 are supported in the bearings 14 and 15, respectively.

The function of each of the devices 16 and 17 is to produce elastic vibration of a characteristic frequency which is changed in response to inclination in the direction to which the device is sensitive. Elastic vibrations of any suitable frequencies may be employed. While I wish it to be understood that any other suitable means may be employed for this purpose, in the embodiment of my invention disclosed herein I employ electrically-operated tuning forks to generate the elastic vibrations, and I vary the frequency of the vibrations produced by changing the natural periods of the tuning forks through movement of weights carried by the prongs of the tuning forks.

Figure 5:
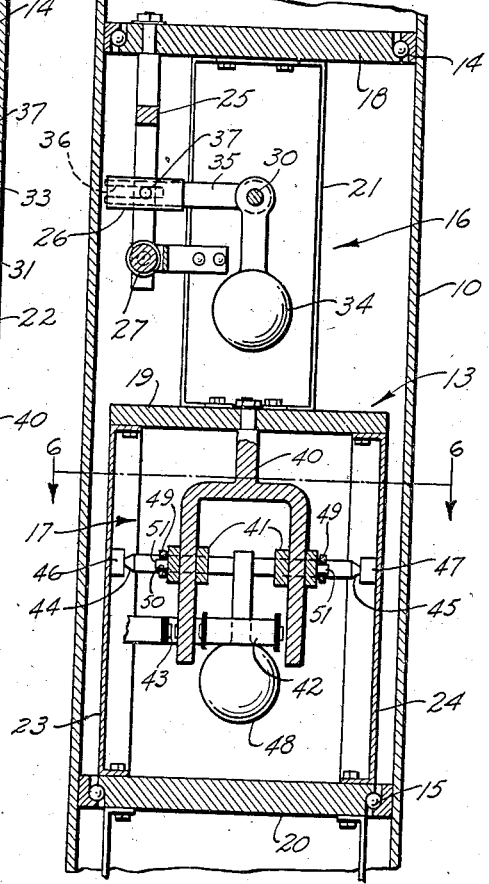
Fig. 5 is a partial sectional view of the same parts shown in Fig. 4, taken on the line 5—5 of Fig. 4.
Figure 6:
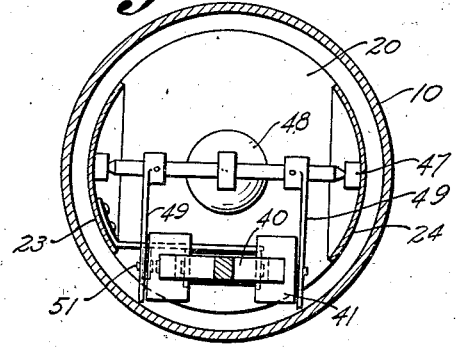
Fig. 6 is a sectional view of the apparatus of Fig. 5 taken along the line 6—6 in the direction of the arrows, as shown.

Rigidly attached to the member 18 is the tuning fork 25 on the prongs of which the weights 26 are mounted to slide freely. The tuning fork 25 is kept in continuous vibration at its natural period by the electromagnet 27 and contacts 28 which are connected in series with a battery 29. In one extreme position of the prong the contacts 28 are closed, energizing the electromagnet 27, which attracts the prong and breaks the connection between contacts 28, whereupon the prong springs back and the contact is again made, and in this manner the fork continues to vibrate. The rate of vibration is determined by the force constant of the prongs of the fork and by the weight of the prongs and its distribution. Thus, the frequency of vibration of the fork 25 is dependent upon the position of the weights 26 carried by its prongs. Moving the weights 26 nearer the ends of the prongs decreases the frequency of vibration, while moving the weights further from the ends of the prongs increases the frequency. Suspended on pivots 30 and 31 which are supported in pivot bearings 32 and 33, respectively, attached to members 21 and 22, respectively, is the relatively large mass 34 which is freely rotatable and therefore always hangs substantially vertically below the axis of pivots 30—31. Connected with the mass 34 for rotation therewith are the horizontal arms 35, one of which lies outside of each of the weights 26. Each of these arms is slotted at 36 to slidably receive the pins 37 which project from the sides of weights 26, the arms 35 being spaced from the weights 26 to permit the prongs of fork 25 and the weights carried thereby to freely vibrate. In Fig. 5, if the mass 34 is displaced to the right, the arms 35 will go down, carrying the weights 26 down nearer the ends of the prongs, and decreasing the frequency of vibration; while if mass 34 is displaced to the left, the arms 35 and weights 26 go up, increasing the frequency of vibration. It will now be clear that if the casing 10 is tilted clockwise to an angle away from the vertical, the mass 34 will, relative to structure 13, be displaced to the right and the frequency will decrease; while if the casing 10 is tilted in a counter-clockwise direction, the mass 34 will, relative to structure 13, be displaced to the left and the frequency will increase. Thus the frequency of vibration of fork 25 follows, and may be employed to indicate, the component of the angle of inclination of the casing 10 in the plane of travel of the mass 34.

Instead of arms 35 being integral with the mass 34, I may employ a gear or lever connection between these two elements to permit the mass 34 to rotate through a different, but related, angle from that traversed by arms 35.

Figure 4:
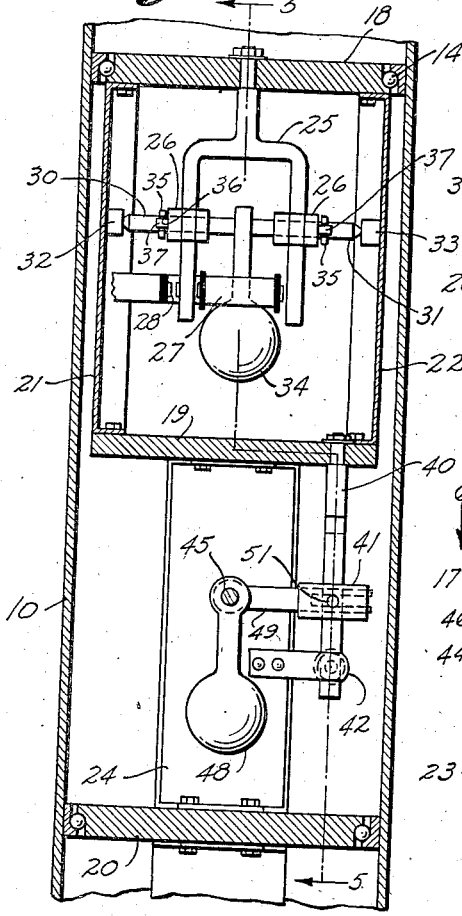
Fig. 4 is a partial elevational view of the apparatus of Fig. 1 with the casing broken away.

The device 17 is similar to the device 16 described above, but employs a tuning fork 40 with a natural period differing markedly from that of the fork 25, and the whole device is oriented perpendicularly to the device 16. The tuning fork 40 is attached to the member 19 and carries on its prongs the slidable weights 41. The fork 40 is kept in continuous vibration at its natural period by means of electromagnet 42 in circuit with contacts 43 and battery 29, in the manner above-described. Suspended on pivots 44 and 45, which constitute an axis transverse to the casing 10 and perpendicular to the pivot axis 30 and 31, and which are supported in pivot bearings 46 and 47, respectively, attached to members 23 and 24, respectively, is the relatively large mass 48 which is freely rotatable and therefore always hangs substantially vertically below the axis of pivots 44 and 45. Connected with the mass 48 for rotation therewith are the arms 49, one of which lies outside of each of the weights 41. Each of these arms is slotted at 50 to slidably receive the pins 51 which project from the sides of weights 41, the arms 49 being spaced from the weights 41 to permit free vibration of the prongs of fork 40 and the weights carried thereby. In Fig. 4 if the casing 10 is tilted clockwise to an angle away from the vertical, the mass 48 will be relatively displaced to the right, the weights 41 will rise on the prongs of fork 40 and the frequency of vibration of fork 40 will increase; while if the casing 10 is tilted counter-clockwise to an angle away from the vertical, it will be obvious that the opposite result will ensue, namely, the frequency of vibration of the work 40 will decrease.

If, now, the body 13 is maintained in a fixed orientation with respect to north, so that pivot axis 30—31 of device 16 always aligns with the north-south direction, and the pivot axis 44—45 of device 17 always aligns with the east-west direction, the frequency of vibration of fork 25 may be employed to measure the inclination of the casing 10, and therefore of the hole in which it is placed, in the east-west direction, while the frequency of vibration of fork 40 may be employed to measure the inclination of the hole in the north-south direction.

Elastic vibration readily travels with relatively small attenuation through metals, and this property is preferably employed to conduct the elastic vibrations of forks 25 and 40 to the surface of the earth. Both tuning forks 25 and 40 are rigidly attached to the supporting structure 13 and communicate their generated vibrations to this structure. The elastic vibration then is communicated to casing 10 through bearings 14 and 15, and from casing 10 to cable 11 which conducts it to the earth's surface. It will be understood that the invention contemplates the possibility of employing means other than the supporting cable for transmitting the elastic vibrations to the earth's surface, for example, the metal casing of the well being surveyed. The equipment at the earth's surface is shown in Fig. 7. Upon emerging from the top 55 of the well being surveyed, the cable 11 is wound up on the reel 56 having a shaft 57 which is journaled in supports 58 and 59 preferably resting on vibration insulating pads 60 and 61 of rubber or of mechanical spring construction, which in turn rest on the derrick floor 62. The shaft 57 is driven by motor 63 which is also preferably supported on a vibration insulating pad 64 on the derrick floor. Interposed between motor 63 and shaft 57 is a suitable gear drive 65, permitting slow movement of the apparatus in the hole, and a rubber vibration insulating bushing 66. The elastic vibrations generated by the apparatus in the hole travel up the cable 11, are communicated to the reel 56, to shaft 57, and through one of its bearings to the support 58, where they are picked up by the sensitive microphone 67 which may be attached thereto. It is understood that the microphone 67 may alternatively be attached to other parts of the apparatus to which the vibrations generated by the apparatus in the hole are communicated, for example, to the end of the cable itself.

The microphone 67 is adapted to translate the relatively feeble mechanical vibrations received from support 58 into variations of electrical potential difference of corresponding frequencies. Microphones of this type are well-known in the art and are readily obtainable on the market. Particularly suitable for this service is a microphone of the "crystal" type, such as described in Electrical Engineers Handbook—John Wiley and Sons, New York, 1936—section 6, pages 24, 25. The electrical output of the microphone 67 is conducted through electric conductors to an electrical measuring apparatus 68, a diagrammatic circuit of which is illustrated in Fig. 8.

The output from the microphone 67 is preferably connected to the input of the amplifier 69 which is adapted to amplify all frequencies which may be generated by either of tuning forks 25 and 40 in any position of the casing 10 and contents. The output of amplifier 69 is led to both of two electrical wave-filters 70 and 71, the frequency of the output of filter 70 being measured by frequency responsive instrument 72, and the frequency of the output of filter 71 being separately measured by frequency responsive instrument 73. The filter 70 is adapted to pass to instrument 72 all those frequencies which may be generated by the tuning fork 25 in any position of the weights 26 thereon, but none of the frequencies which may be generated by tuning fork 40 in any position of its weights 41; while filter 71 is adapted to pass to instrument 73 all those frequencies which may be generated by tuning fork 40 in any position of the weights 41 thereon, but none of the frequencies generated by tuning fork 25 in any position of its weights. Wave-filters suitable to serve as filters 70 and 71 are well-known in the electrical art. The range of frequencies generated by fork 25 is markedly different from the range of frequencies generated by fork 40, and the two ranges do not overlap. It will be clear, then, that the indication of frequency meter 72 serves to indicate the inclination of the structure 13 in the east-west direction, and the indication of frequency meter 73 serves to indicate the inclination of the structure 13 in the north-south direction. On each meter is some middle position which corresponds to a vertical positioning of the casing 10, and deviation of the meter indicator to one side shows tilting of the apparatus in the hole in a clockwise direction, while deviation to the other side shows tilting of the apparatus in a counter-clockwise direction. The extent of the deviation of the meter indicator is an indication of the deviation from vertical of the apparatus in the hole. Frequency meters 72 and 73 may be of the Weston type as described in Electrical Engineers Handbook, section 10, page 9.

Figure 9:
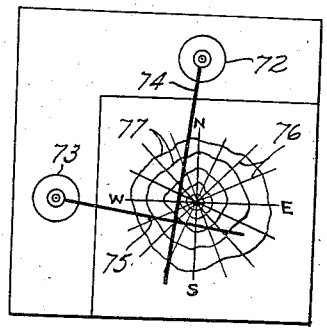
Fig. 9 is a plan view of one form of the indicating instrument.

The instruments 72 and 73 are preferably incorporated in a composite indicating instrument as shown in Fig. 9. The meters 72 and 73 are located so that when each is indicating a frequency corresponding to zero deviation from vertical, the indicating arms or needles 74 and 75, respectively, intersect one another at right angles, one needle being located above the other so that both can freely rotate without interference. Under the two needles is a chart having a north-south axis coinciding with the needle 74 of meter 72 when indicating a vertical position, and an east-west axis coinciding with the needle 75 of meter 73 when indicating the vertical position. Diverging from the intersection of these axes are lines, such as 76, corresponding to various directions taken by the structure 13, and therefore corresponding to the directions of the surveyed hole, at various points. Surrounding the intersection of the axes are lines, such as 77, corresponding to various angles of inclination from vertical. The position on the chart of the intersection of the indicating needles 74 and 75, therefore, gives instantly both the angle of inclination and the direction of the hole in which the casing 10 is located.

In Fig. 10 is shown an alternative indicating device which avoids the parallax inherent in that of Fig. 9. A preferably translucent screen 80, of ground glass is employed, on which are marked the axes of north-south, and of east-west, the diverging lines of direction 76, and the closed lines of inclination 77, as on the chart of Fig. 9. Below the chart 80 the frequency meters 72 and 73 are arranged with mirrors 81 and 82, respectively, attached to their moving parts and so positioned that they serially reflect a beam of light from the source 83 onto the screen 80. The mirror 81 attached to the moving part of meter 72 rotates about the axis 84—84, parallel to the north-south axis of screen 80; while the mirror 82 attached to the moving part of meter 73 rotates about an axis 85—85, perpendicular to the axis 84—84 of mirror 81. The source of light 83 preferably directs onto the mirror 82 a small beam of parallel light, or light which is adapted to come to a focus on the screen 80, so as to result in a small spot 86 of light on the screen. The relative positions of the source 83, mirrors 81 and 82, and screen 80 are such that when meters 72 and 73 measure frequencies corresponding to the vertical position of casing 10, the spot 86 of light is at the intersection of the north-south and east-west axes. Any other inclination and direction of the casing 10 is then indicated by the location of the spot 86 on the screen 80.

It is understood that, if desired, suitable instruments may be employed for graphically recording the frequencies delivered by filters 70 and 71.

In the foregoing description it has been assumed that the structure 13 and associated parts are always maintained oriented in the same direction with respect to north, so that the pivot axes always are directed east-west and north-south. A means employed to accomplish this will now be described. The structure 13 is mounted rotatably in the bearings 14 and 15 in the casing 10 and is adapted to be rotated through gearing 90 by the electric motor 91 whose frame is supported stationary with respect to casing 10. To the under side of member 20, and rotatable with structure 13, are secured two rigid supporting members 87 and 88. Supported on and between the members 87 and 88 are two preferably matched light sensitive cells 92 and 93. These cells are preferably of the photo-voltaic type which generates an electromotive force upon exposure to light, which is substantially proportional to the amount of light received. Such cells are obtainable on the market under the name of Photronic cells. These cells are shown in the equilibrium position in which they are located on the east-west diameter of the casing 10, the cell 92 being at the west, and the sensitive surfaces of the cells being on their under sides. Below the cells 92 and 93 is an opaque screen 94 preferably somewhat less than a half circle in extent and mounted on a circular frame 95 which includes a diametrically-disposed magnet 96, approximately bisecting the opaque screen 94. The frame 95, screen 94, and magnet 96 are mounted on pivot 98 and are free to take the natural orientation of the magnet 96, which is always with the north-seeking pole 97 at the north. A guard pin 89 above the center of magnet 96 prevents accidental dislocation of the magnet from its pivot 98. Below the frame 95 and associated parts are two sources of light 99 and 100, supported by and rotating with members 87 and 88 and located on the east-west diameter of the casing 10, the source 99 being at the west. The lamps 99 and 100 are energized by connection with the battery 29.

Figure 2:
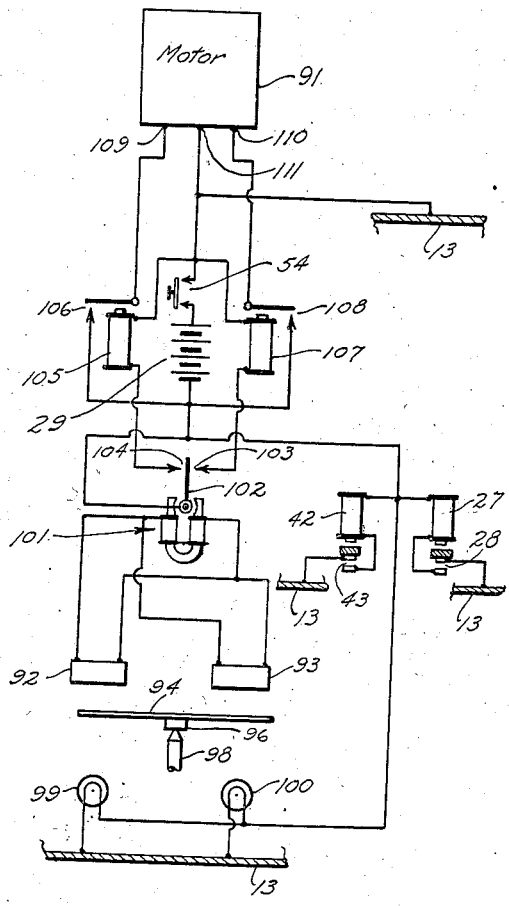
Fig. 2 is a diagram of the electrical circuits in the apparatus shown in Fig. 1.

The circuit connections between the various elements of the orienting mechanism are shown in Fig. 2. The light sensitive cells 92 and 93 are both connected to the operating terminals of a relay 101 which is adapted to cause switch arm 102 of the relay to make the contact 103 when a potential difference of one polarity exists across its terminals, and to make the contact 104 when a potential difference of opposite polarity is applied across its terminals. The cells 92 and 93 are connected to the operating terminals of the relay 101 in such a manner that when cell 92 alone receives light from lamp 99 the resulting potential difference across the operating terminals of the relay 101 is of such polarity as to cause contact 104 to be closed; while when cell 93 alone receives light from lamp 100 the resulting potential difference across the operating terminals of relay 101 is of opposite polarity and contact 103 is closed. When both cells receive light from their respective sources, the position of switch arm 102 is determined by the relative magnitude of the potential differences produced by the two cells, the relay 101 being influenced by the greater of the two. In circuit with the contact 104 and battery 29 through switch 54 is the operating coil of power relay 105 which, when contact 104 is closed, causes the relay contact 106 to be closed. In circuit with the contact 103 and battery 29 is the operating coil of power relay 107 which, when contact 103 is closed, causes the relay contact 108 to be closed. The contact 106 connects one side of battery 29 to terminal 109 of motor 91, and the contact 108 connects the same side of battery 29 to terminal 110 of motor 91. The other terminal 111 of motor 91 is connected to the other side of battery 29 from that to which the terminals 109 and 110 are connectible. The internal connections of the motor 91 are such that when terminal 109 is energized the movable part of the motor rotates in a direction such as to cause the structure 13 and associated parts to rotate clockwise as viewed from above in Fig. 1; while when terminal 110 is energized, the motor causes the structure 13 to rotate counter-clockwise as viewed from above in Fig. 1.

The motor 91, relays 101, 105, and 107, and battery 29 may be supported rigidly with respect to the casing 10 on a removable base 112 secured to the casing, and which carries a supporting vertical bracket 113. The switch 54 which energizes the electrical system may be flush mounted in the casing 10, as shown. The conductors between the stationary and movable parts of the apparatus are flexible and may pass through openings in one or more of the members 20, 19, 18, and 112.

Assume now, that the casing 10 and structure 13 is turned clockwise (viewed from above) away from the equilibrium position shown and described above, so that the pivot axis 30—31 no longer is directed in the north-south direction, but rather in a northeast-southwest direction. The magnet 96 will still retain its north-south orientation. The cell 92 will then receive less light from lamp 99, and cell 93 will receive more light from lamp 100 because of the relative rotation of the cells over the opaque screen 94. The relay 101 will then operate to cause contact 103 to be closed, whereupon the relay 108 will close and energize contact 110 of the motor 91, which will then rotate in such a direction as to cause rotation of structure 13 and all associated parts in a counter-clockwise direction (viewed from above) within casing 10 until the pivot axis 30—31 is again restored to the north-south direction when the currents delivered by cells 92 and 93 to relay 101 are again equal and the contact 103 is opened, stopping the motor. It is obvious that should the structure 13 be rotated in the other direction away from its position of equilibrium, the relay contacts 104 and 106 will be closed and the motor 91 will rotate in the proper direction to bring the structure 13 and the pivot axes again to their position of equilibrium. Thus, regardless of what orientation is taken by the casing 10, the pivot axes are always maintained in a fixed orientation with respect to north, so that the device 16 always is sensitive to inclination in only the east-west direction, and the device 17 always is sensitive to inclination in only the north-south direction.

Should there be a difference in the potential differences produced by the cells 92 and 93 when the cells are located on an east-west diameter, as represented, due either to a difference in response of the cells or a difference in luminous intensity of the lamps 99 and 100, the difficulty may easily be remedied by adjusting the angular position of the opaque screen 94 on the magnet 96. To this end the screen 94 is secured to magnet 96 by a screw 114 which may be loosened to permit turning of the screen to a position in which the cells 92 and 93 produce equal potential differences when the pivot axis 30—31 is oriented north-south, as required.

I wish it to be understood that in place of the above-decsribed means for maintaining constant orientation, I may employ other devices, such as the gyroscope, in a manner well-known in the art, but the above-described means has advantages over the gyroscope, such as the fact that it can operate for an indefinite time period without attention.

In operation, the apparatus of Fig. 1 is lowered into a hole to be surveyed, and observations may immediately be begun. The inclination and direction of the hole are continuously indicated on the instrument of Fig. 9 or Fig. 10 or are recorded on suitable recording instruments. No calculations are required and no appreciable time is consumed in making observations. The indicating instrument may be continuously observed to assure that there are no sudden changes in inclination or direction and the instrument in the hole may be stopped at chosen locations and started again at will. The depth of the apparatus in the hole may be determined by measuring the length of the cable supporting the apparatus in the hole. The apparatus of my invention has the advantage that any particular region in a hole may be explored in any desired detail by backing up the apparatus in the hole and observing visually the inclination and direction of the hole at every point of the region under consideration. My apparatus has another advantage in that the results obtained are practically not influenced by temperature difference, since the temperature dependence of the frequency of the vibration source is practically the only cause for a temperature effect, and this temperature dependence in the case of tuning forks is negligibly small. Neither are my results dependent upon the length of the supporting cable. They do not depend upon measurement of any intensity, but rather of frequencies which are accurately measurable and dependent solely upon the factors which it is desired to measure. The apparatus of my invention has the further advantage that the supporting cable need not include insulated electrical conductors, and is therefore cheaper than one requiring such conductors, and is also free from service troubles due to failure of the cable.

It is understood that various changes and modifications in the apparatus disclosed may be made by those skilled in the art without departing from the spirit of the invention defined by the appended claims.

I claim as my invention:

1. Apparatus for determining inclination comprising a body adapted to assume the inclination to be measured, means for generating an elastic vibration, means for varying the frequency of said elastic vibration in response to the inclination of said body, and frequency measuring means responsive to said elastic vibration.

2. Apparatus for determining inclination at a remote location comprising a body adapted to assume the inclination to be measured, means at said location for generating an elastic vibration, means for varying the frequency of said elastic vibration in response to the inclination of said body, means for conducting said elastic vibration from said remote location to a place of measurement, and frequency measuring means responsive to said elastic vibration.

3. Apparatus for determining inclination comprising a body adapted to assume the inclination to be measured, means for generating an elastic vibration, means for varying the frequency of said elastic vibration in response to the inclination of said body, means for translating said elastic vibration into a varying electric potential difference of corresponding frequency, and electrical measuring means responsive to said frequency.

4. Apparatus for determining inclination at a remote location comprising a body adapted to assume the inclination to be measured, means at said location for generating an elastic vibration, means for varying the frequency of said elastic vibration in response to the inclination of said body, means for conducting said elastic vibration from said remote location to a place of measurement, means at said place for translating said elastic vibration into a varying electric potential difference of corresponding frequency, and electrical measuring means responsive to said frequency.

5. Apparatus for determining inclination comprising a body adapted to assume the inclination to be measured, a tuning fork adapted to generate elastic vibration at its natural period, means for varying the natural period of said tuning fork in response to the inclination to be measured, and measuring means responsive to the frequency of elastic vibration produced.

6. Apparatus for determining inclination comprising a body adapted to assume the inclination to be measured, a tuning fork adapted to generate elastic vibration at its natural period, a mass pivotally suspended from said body so as to take an angular position relative to said body which is dependent upon the inclination of said body, weights movably carried on the prongs of said tuning fork and adapted to be moved along said prongs in response to change in the relative angular position of said suspended mass, means for translating said elastic vibration into a varying electric potential difference of corresponding frequency, and electrical measuring means responsive to said frequency.

7. Apparatus for determining inclination of a hole comprising, in combination: a body in said hole adapted to assume the inclination of said hole, means for setting up in said body an elastic vibration dependent in frequency upon the inclination of said body, elastic means extending into said hole and attached to said body for the support thereof and for transmission of said elastic vibration, and means at the top of the hole for measuring the frequency of the elastic vibration transmitted through said elastic supporting means.

8. Apparatus for determining inclination of a hole comprising, in combination: a body in said hole adapted to assume the inclination of said hole, means for setting up in said body an elastic vibration dependent in frequency upon the inclination of said body, an elastic cable extending into said hole and coupled to said body for the support thereof and for transmission of said elastic vibration, cable-winding means at the top of said hole for raising and lowering said cable, and means for measuring the frequency of the elastic vibration transmitted through said elastic cable and including an elastic vibration pick-up device associated with said cable-winding means.

9. Means for measuring the frequencies of two elastic vibrations each of which is variable within a frequency range distinct from that of the other and both of which are present in the same elastic member, which comprises: an elastic vibration pick-up device associated with said member and adapted to translate said two elastic vibrations into two variable electric potential differences of corresponding frequencies, electrical filter means for separating an electric potential difference having a frequency within one of said frequency ranges from an electric potential difference having a frequency within the other of said frequency ranges, and indicating means responsive separately to the frequencies of said two variable electric potential differences.

GENNADY POTAPENKO.